United States Patent [19]

Haruta et al.

[11] Patent Number: 5,347,528
[45] Date of Patent: Sep. 13, 1994

[54] PULSE LASER IRRADIATION APPARATUS FOR COATED METAL MATERIAL

[75] Inventors: Koichi Haruta; Yuichiro Terashi, Sodegaura, both of Japan

[73] Assignee: Mitsui Petrochemical Industries, Ltd., Tokyo, Japan

[21] Appl. No.: 42,516

[22] Filed: Apr. 5, 1993

[30] Foreign Application Priority Data

Apr. 3, 1992 [JP] Japan .................................. 4-110837

[51] Int. Cl.$^5$ .............................................. H01S 3/10
[52] U.S. Cl. ........................................ 372/25; 372/29; 372/30; 219/121.64; 219/121.7
[58] Field of Search ............................ 372/25, 29, 30; 219/121.64, 121.7

[56] References Cited
U.S. PATENT DOCUMENTS

| | | | |
|---|---|---|---|
| 4,916,284 | 4/1990 | Petrick | 219/121.64 |
| 4,959,838 | 9/1990 | Barnes | 372/25 |
| 4,972,156 | 11/1990 | Gregor et al. | 372/25 |
| 5,073,687 | 12/1991 | Inagawa et al. | 219/121.7 |

FOREIGN PATENT DOCUMENTS

| | | |
|---|---|---|
| 2600923 | 1/1988 | France . |
| 04-251684 | 9/1992 | Japan . |
| 04-258391 | 9/1992 | Japan . |
| 2218660 | 11/1989 | United Kingdom . |

*Primary Examiner*—Georgia Y. Epps
*Attorney, Agent, or Firm*—Sherman and Shalloway

[57] ABSTRACT

In order to obtain a weld bead having a good outer appearance with little splash of sputters or the like and a sufficient shearing force, there is provided a flash lamp control section for controlling flash lamps so as to generate two rectangular waves in a pulse wave form at every cycle of a pulse laser beam generated by a pulse YAG laser during the irradiation of the pulse laser beam on coated metal materials. The flash lamp control section is adapted to control a relationship between a peak power and a pulse width of a first rectangular wave and a peak power and a pulse width of a second rectangular wave in predetermined ranges. Under the control of the flash lamp control section, the pulse laser beam generated by the pulse YAG laser is irradiated to the coated metal materials thereby carry out the irradiating operation.

11 Claims, 15 Drawing Sheets

PULSE LASER IRRADIATION APPARATUS FOR COATED METAL MATERIAL

BACKGROUND OF THE INVENTION

The present invention relates to a pulse laser irradiation apparatus for a coated metal sheet whose top and tail surfaces are subjected to such as a Zn-plating treatment for a rust-proof effect. A typical plated steel sheet is defined by G3302 of Japanese Industrial Standards (JIS). A thickness of the steel sheet is in the range from 1.6 mm to 6.0 mm in the case where a heat-rolled plate, and is in the range from 0.11 mm to 3.2 mm in the case where a cold rolled plate. Such a kind of Zn-plated steel sheet is widely used in various industrial fields such as an automotive field, a general electric field, a light industrial field, a heavy industrial fields and the like.

The techniques for welding Zn-plated steel plates together will now be described in more detail. In a welded example as shown in FIG. 13(a), two steel plates 2-1 and 2-2 each having Zn-platings 3 on both sides are overlapped with each other. In another example as shown in FIG. 13(b), a single steel plate 2a having Zn platings is bent back to form a double folded structure.

In an example of a three layer welding as shown in FIG. 14(a), three steel plates 2-1, 2-2 and 2-3 each having Zn-platings 3 on both sides are laminated. In FIG. 14(b), a single steel plate 2b having Zn-plating on both sides is folded and another steel plate 2-1 having Zn-platings on both sides is inserted into a recess defined by the folded steel plate 2b.

In the same way, a plural layer welding may be carried out for four or more layers as shown in FIGS. 15(a) and (b).

A purpose of a semi-penetration welding in an overlap irradiating is to keep an outer appearance quality of the surface steel plates while insuring the bond strength at a suitable level. In other words, as shown in FIG. 14(b), it is unnecessary to carry out any surface finishing treatment after the welding, and it is possible to keep the outer surface quality in the same condition as the original steel plate surface.

Also, in the case as shown in FIG. 14(a), it is possible to keep the surface quality of the original steel plate surface only with a minimum surface finishing treatment. If, for instance, a grinding work or the like is effected on the Zn-plated steel plates as a surface treatment, a Zn-plate layer on the surface is ground away so that the rust-proof effect of the Zn-plating treatment is remarkably degraded.

In general, known methods for laser-welding of Zn-plated steel plates are categorized into, for example, a method using a continuous wave form generation type laser(which method will be hereinafter referred to as a CW method)and a method using a pulse generation type laser (which method will be hereinafter simply referred to as a pulse laser method). These methods will be explained.

(1) An example of the method using a CW type laser is an overlap welding with, for example, a CW type $CO_2$ laser. In the CW type laser, key holes and a laser induction plasma are continuously maintained during the irradiating operation. As a result, although Zn-metallic vapor (a part of which is kept under a plasma state) which is generated by the laser beam irradiation would be removed effectively away from the keyholes, the laser output is excessively applied to the surface to be worked in comparison with the pulse laser method.

For this reason, a fugion-solidification part is increased, resulting in full penetration.

Also, even if the partial semi-penetration would be obtained be carefully selecting the irradiation conditions, it would be impossible to obtain good surface appearance of the steel plate due to the fact that there is anon-uniformity in gaps between the Zn-plated steel plates which are work pieces to be welded (which gaps will be hereinafter referred to as the "gap between the workpieces") and further there is a non-uniformity in a plating amount for the Zn-plated steel plates (for instance, in case of F08, the Zn-plating amount is in the range of 60 to $100 g/m^2$ or due to the fact that an excessive heat causes distortion or warpage.

(2) On the other hand, as the method using the pulse laser, an overlap welding technique with a solid laser such as an Nd:YAG laser has been proposed. As the Nd:YAG laser, an overlap continuous welding and an overlap spot welding are well known.

The output of the pulse laser is given by the following relationship: The average output P(kW) is given:

$$P = E \cdot f$$

The energy E(J) of one pulse is given:

$$E = P' \cdot t$$

where P(kW) is the average output E(J) is the energy of one pulse, P'(kW) is the peak power of one pulse, i.e., the average peak power per one pulse width, t(msec) is the pulse width of one pulse, and f(Hz) is the pulse frequency.

In general, the irradiating volume and penetration depth relative to a predetermined welding speed in the pulse laser irradiating will mainly depend upon the pulse energy. The energy(determined by the average ouput and the frequency) of one pulse to be needed to obtain a desired penetration depth is shown in, for example. FIG. 16 in which, for example, the pulse time, the frequency and the average output are selected at optimum levels for the working conditions even in the same curve for the pulse irradiating. If the average output is kept constant, the penetration depth is increased in accordance with the pulse laser method in comparison with the CW laser method.

A pulse wave form for the pulse energy will be explained.

In a rectangular wave form as shown in FIG. 17, the peak power P(kW) is kept substantially unchanged within a pulse width t. In an integrated wave form as shown in FIG. 18, the peak power P is changed within the pulse width t(msec). FIG. 19 shows an example the wave form overlapped with the CW laser type. In these examples, the desired penetration depth is determined basically by the pulse energy of the above-described rectangular wave.

Also, in case of metals whose surface materials are likely to be blown by the pulse laser irradiation. It is possible to obtain a good welding bead by selecting the pulse energy density (i.e., peak power density).

The pulse energy and the pulse energy density (i.e., peak power density) needed to obtain a desired penetration depth relative to a plate thickness of the Zn-plated steel plate and a predetermined welding speed may readily be obtained in a well known method.

Also, in the laser irradiating process. If fumes or sputters would be stuck to lenses of an optical system. The latter would be damaged. In order to avoid this, various fume or sputter preventing methods have been proposed. Methods for protecting the optical system from the sputters and fumes are categorized into a method using a protective glass plate in front of the work lens, a method for splashing the sputters with compressed air from nozzles, and a hybrid method thereof.

However, the above-proposed methods still suffer from the following problems. Namely, in a general Nd:YAG laser pulse laser, the laser irradiation by the pulse oscillation or generation would cause key holes and laser induced plasma to occur intermittently. For this reason, the plated metal vapor (whose part is kept under a plasmatic state) or crushed organic vapor in case of organic material coting generated by the laser irradiation has to be effectively removed for every one pulse.

However, only with a single kind of rectangular pulse, it is impossible to remove the plated metal vapor or clushed organic vapor. As a result, there would be welding faults by the entrainment of the vapor into the molten material (which faults will be referred to as blow holes). Otherwise, the molten metal is splashed by the vapor pressure resulting in bond faults. In any case, the welding strength would be considerably degraded in addition to the faulty welding outer appearance such as blow holes and sputter splash.

In many cases, the sputter splash causes the optical systems to be damaged to increase a load imposed on the maintenance. Furthermore, in the case where there are gaps between the steel plates, in addition to the foregoing phenomena, the plated metallic vapor would escape through the gaps to the outside so that the welded metal is splashed or dispersed between the steel plates, resulting in welding faults. However, in some cases, if a gap between the workpieces is suppressed in a predetermined range, since the plated metal vapor will effectively escape from the gap, good weld beads may be obtained.

Nevertheless, in a field of an industrial application, it is very difficult to maintain the gap between the workpieces in the predetermined range. Also, turning to the protection of the optical systems, in accordance with the conventional methods, since the sputters are splashed with large momentums, it is impossible to completely remove the sputters with the compression air, resulting in adhesion of sputters on the protective glass or damages of the optical systems.

It is also impossible to completely remove fumes (metal particles). The fumes would stick on optical components such as a protective glass or a parabolic mirror. This would increase cost for the optical components such as a protective glass. In addition, the replacement of the optical components is time-consuming.

Accordingly, a primary object of the present invention is to provide a pulse laser irradiation method for irradiating a pulse laser beam onto plated steel plates, and more particularly a pulse laser irradiation apparatus by which weld beads having a good weld outer appearance with little faults such as blow holes and a small splash such as sputters and the like with a sufficient shearing force may be obtained by semi-penetration in an overlap spot and an overlap continuous weld (lap seam weld) for plated steel plates.

SUMMARY OF THE INVENTION

According to the present invention, there is provided a pulse laser irradiation apparatus for irradiating a pulse laser beam onto coated metal materials, comprising: a pulse laser generator having a laser medium and a oower source fore exiting the pulse laser from outside; and a generation control section for controlling the pulse laser generator. The generation control section generates two rectangular waves in a pulse wave form at every cycle of the pulse laser beam generated by the pulse laser generator and controls are la between a peak power $P_1$ and a pulse width $t_1$ of a first rectangular wave and a peak power $P_2$ and a pulse width $t_2$ of a second rectangular wave in predetermined ranges.

Incidentally, the laser medium includes yttrium aluminum garnet doped with neodymium (Nd:YAG), ruby, glass or the like for a solid laser. Also, the laser medium includes $CO_2$ for a gas laser.

The power source may be flash lamps, semiconductor laser and the like for the Nd:YAG laser, ruby laser, color laser, glass laser and the like.

For the generation control section, the electric power of the power source is varied to control the peak powers, or otherwise a semiconductor switch of the power source or the like may be used to control the supply period to thereby control the widths of the pulses.

According to the invention, since the generation control section generates two rectangular waves in a pulse wave form at every cycle of the pulse laser beam generated by the pulse laser generator and controls a relationship between a peak power $P_1(kW)$ and a pulse width $t_1$(msec:millisecond) of a first rectangular wave and a peak power $P_2(kW)$ and a pulse width $t_2$(msec:millisecond) of a second rectangular wave in predetermined ranges, when the generated laser beam is irradiated onto the coated metal plate, the plating metal vapor or crushed organic vapor may be effectively removed a way from the weld beads to obtain the weld beads having a good outer appearance and the sufficient shearing force with little weld defects.

The predetermined ranges in the generation control section are as follows:

$$0 < t_1/(t_1+t_2) < 1,$$

$$P_1/P_2 > 1.$$

and $$t_1/(t_1+t_2) \leq 0.6 \cdot (P_1/P_2) - 0.2.$$

When the pulse laser in these ranges is applied to the steel plates, the above-described effect is ensured.

More preferably, the predetermined ranges are as follows:

$$0 < t_1/(t_1+t_2) < 1.$$

$$P_1/P_2 > 1,$$

and $$t_1/(t_1+t_2) < 0.6 \cdot (P_1/P_2) - 0.2.$$

More preferably, the predetermined ranges are as follows:

$$0.3 \leq t_1/(t_1+t_2) < 0.5.$$

and $$1.5 \leq P_1/P_2 \leq 2.0$$

More preferably, the predetermined ranges are as follows:

$$0.3 < t_1/(t_1+t_2) < 0.5.$$

and $$1.5 < P_1/P_2 < 2.0$$

When the pulse laser in these ranges is applied to the coated metal plates, the above-described effect is further ensured. In this case, the continuous wave form (CW) may be overlapped with the foregoing wave form.

Furthermore, under the control of the generation control section, the interval $t_{int}$ between the two rectangular waves is set 10 msec or less, to thereby insure the effect.

Furthermore, under the control of the generation control section, the interval $t_{int}$ between the two rectangular waves is set 2 msec or less, to thereby insure the effect.

The generation control section controls the pulse laser generator so that, when a plurality of coated metal plates overlapped one on another are welded together, a pulse energy of the pulse laser beam is set at a strength such that a part of the second coated metal plate is welded through the second coated metal plate. Thus, the pulse laser beam may be irradiated with the semi-penetration strength.

An angle $\theta$ defined between a centerline of the pulse laser beam and a line normal to a surface of the coated metal plate is in the range of 0° to 60° to thereby ensure the effect.

An angle $\theta$ defined between a centerline of the pulse laser beam and a line normal to a surface of the coated metal plate is in the range of 10° to 40° to thereby further ensure the effect.

As described above, according to the present invention, the pulse laser irradiation wave form is of the two-stage rectangular wave type, thereby effectively removing the metal or organic vapor away from the weld beads to obtain the weld beads having a good outer appearance with almost no weld defects and with sufficient weld strength. Also, it is possible to reduce a burden for maintenance without damaging an optical system.

The usage, for which pulse laser irradiation apparatus or method according to the present invention is the most suitable, is laser welding apparatus or method for coated metal material. However, it is possible to use as processing apparatus or method such as opening the hole for coated metal material such as plated steel.

According to the invention, coated metal material means material like members which including steel, aluminum, titanium alloy or copper alloy and the like, coated (including plated) by organic or inorganic materials.

The sape of the coated metal material is suitable to platy.

DESCRIPTION OF THE PREFERRED EMBODIMENTS

Figure 1:
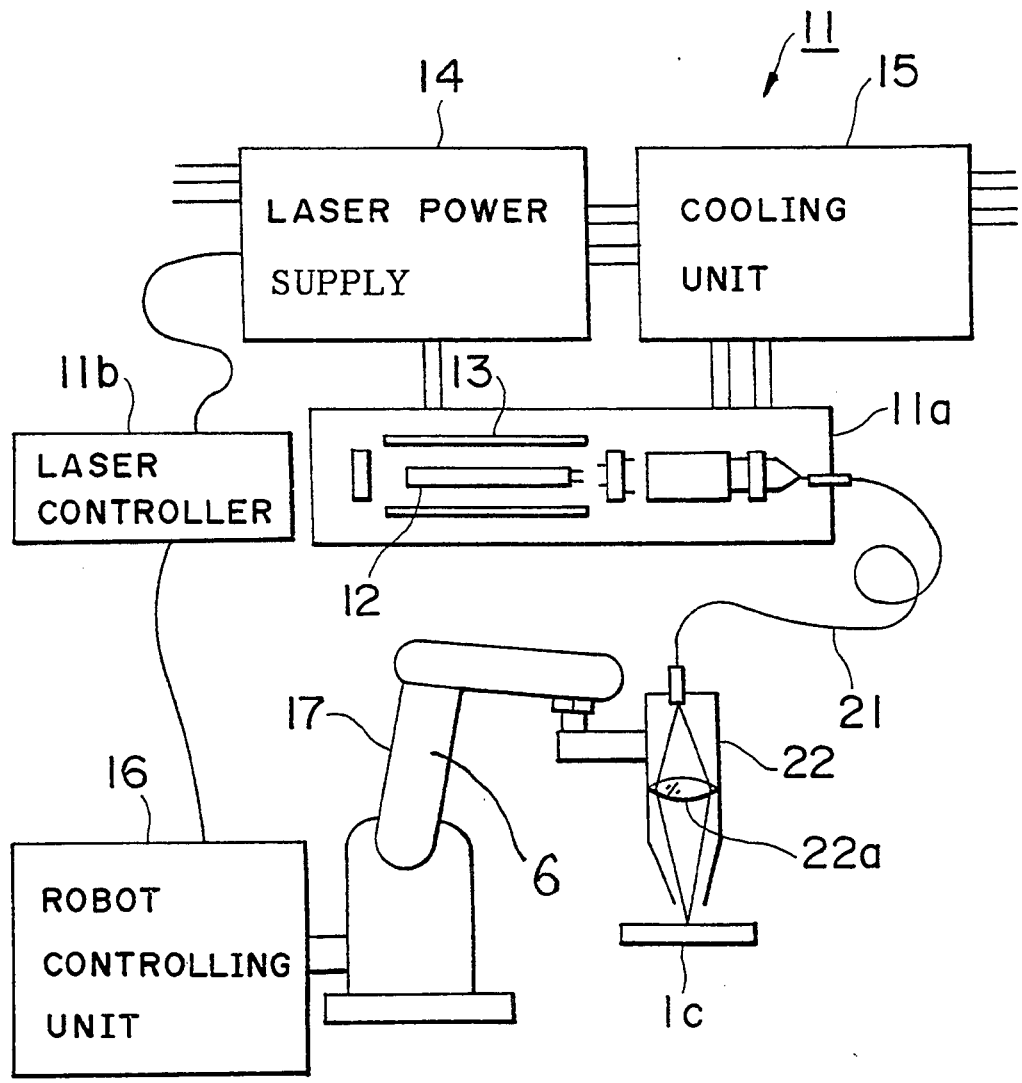
FIG. 1 is a view showing a structure according to the invention.

The present invention will now be described by way of example in accordance with embodiments with reference to the accompanying drawings. FIG. 1 shows a schematic view showing primary components of a pulse laser irradiation apparatus in accordance with one embodiment of the invention.

EXAMPLE 1

As shown in FIG. 1, the pulse laser irradiation apparatus functions as a laser working machine and has the following structure. A pulse laser irradiation unit 11 is composed of a laser head 11a and an Nd:YAG rod 12, a laser power supply 14 for supplying the laser head 11a with drive powers, a laser controller 11b for controlling the laser power supply 14 and a cooling unit 15.

The laser power supply 14 functions as a generation controller section for the YAG laser 12 which is a laser medium and, more specifically, controls a peak power by a voltage control of flash lamps 13 and an operation time by using semi-conductor switches.

The Nd:YAG rod 12 receives the power supply from the flash lamps 13 to have an average output of 400 W in a multimode and to generate laser beams with a wavelength of 1.06 micrometers. A pulse repetition rate is 8 pps and one-pulse energy is 50 J.

An optical fiber 21 is connected to the laser head 11a for transmitting the laser beams emitted from the laser head 11a to the focusing unit 22.

The laser focusing unit 22 is mounted on a 6-axis multi-joint robot 17 which in turn may move the laser focusing unit 22 in three directions X, Y and Z to take any desired coordinate position ($X_1$, $Y_1$, $Z_1$).

The six-axis multi-joint robot 17 is adapted to control the laser focusing unit 22 to move to the coordinate ($X_1$, $Y_1$, $Z_1$) on the basis of its own coordinate ($X_2$, $Y_2$, $Z_2$) a control positional information ($X_1$, $Y_1$, $Z_1$) outputted from the robot control unit 16 for setting the focusing unit 22 to a predetermined position.

The robot control unit 16 also outputs to the six-axis multiarticulation robot 17 a control positional in format in for moving the focusing unit 22 to a predetermined position and/or a predetermined direction.

Figure 2:
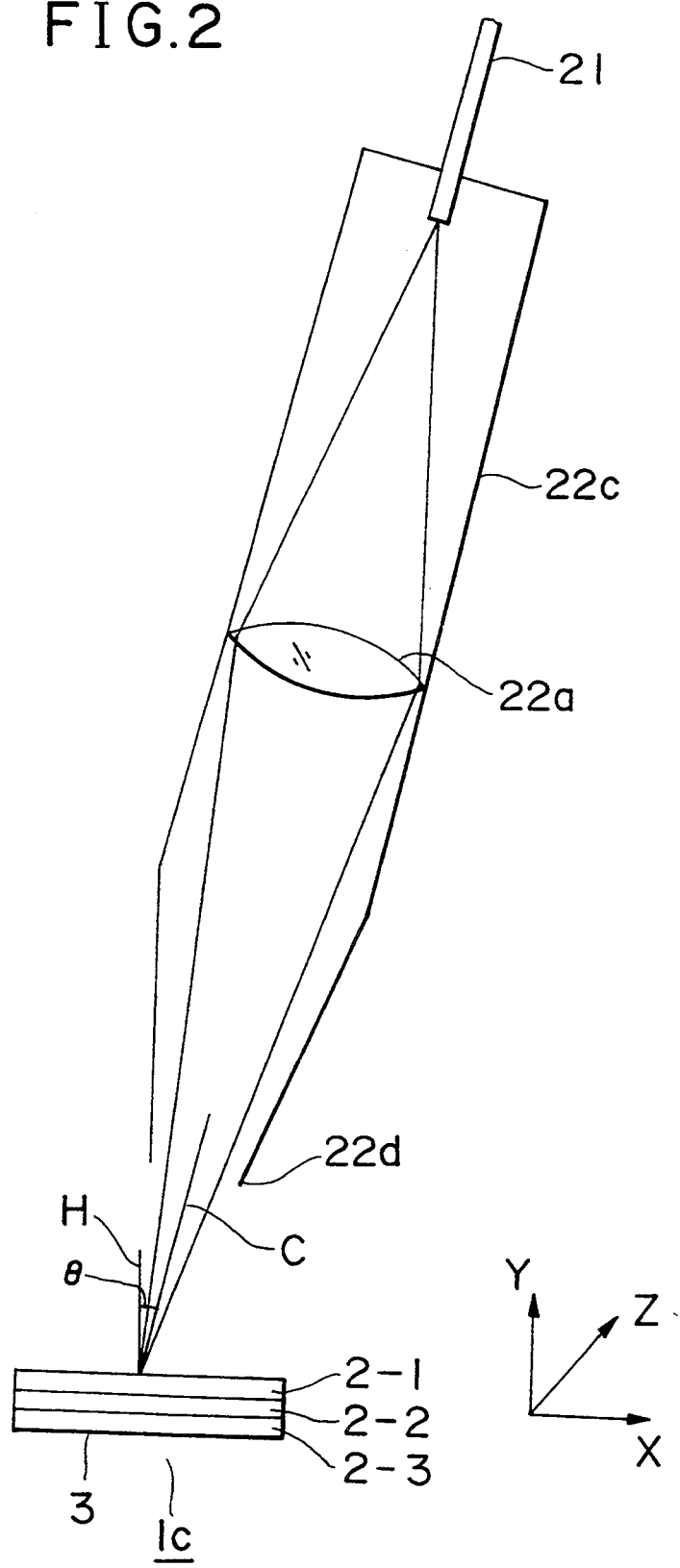
FIG. 2 is a structural view showing a laser irradiation unit.

FIG. 2 shows a view showing a structure of the focusing unit 22. As shown in FIG. 2, a condenser lens 22a is provided within a body 22c with its tip end being tapered. The laser beam converged through the condenser lens 22a is irradiated from a laser irradiation port 22d. A focal length of the condenser lens 22a is 120 mm with its half-angle being 15 m rad. The condenser lens 22a is of the just focus type. Argon gas or nitrogen gas is introduced into the focusing unit 22 at a rate of 10 liters/minute.

The above-described six-axis multi-joint robot 17 is adapted to control the laser emission unit 22 to move to the coordinate ($X_1$, $Y_1$, $Z_1$) on the basis of its own coordinate ($X_z$, $Y_2$, $Z_2$) and the control positional information ($X_1$, $Y_1$, $Z_1$) outputted from the robot control unit 16 for setting the focusing unit 22 to a predetermined position.

With such an arrangement, the inclination control of the focusing unit 22 in the X-direction by the six-axis multi-articulation robot 17 will set an angle $\theta$ of a centerline C of the laser beam relative to a line H normal to the surface of the irradiating sample 1 to 20°. The moving control of the laser emission unit 22 in the X-direction by the six-axis multi-articulation robot 17 causes the irradiating speed of the irradiating sample 1c to be set at 50 cm/min.

The weld sample 1c is a zinc plated steel plate (JIS G3302 SGCC SDN) with F08(minimum application amount 60/60g/m² on both sides). The sample 1c is 100 mm long, 30 mm wide and 0.8 mm thick. The sample 1c is made of three overlap layers with a gap of 0 mm between the adjacent layers. The weld bead length is 20 mm.

Figure 3:
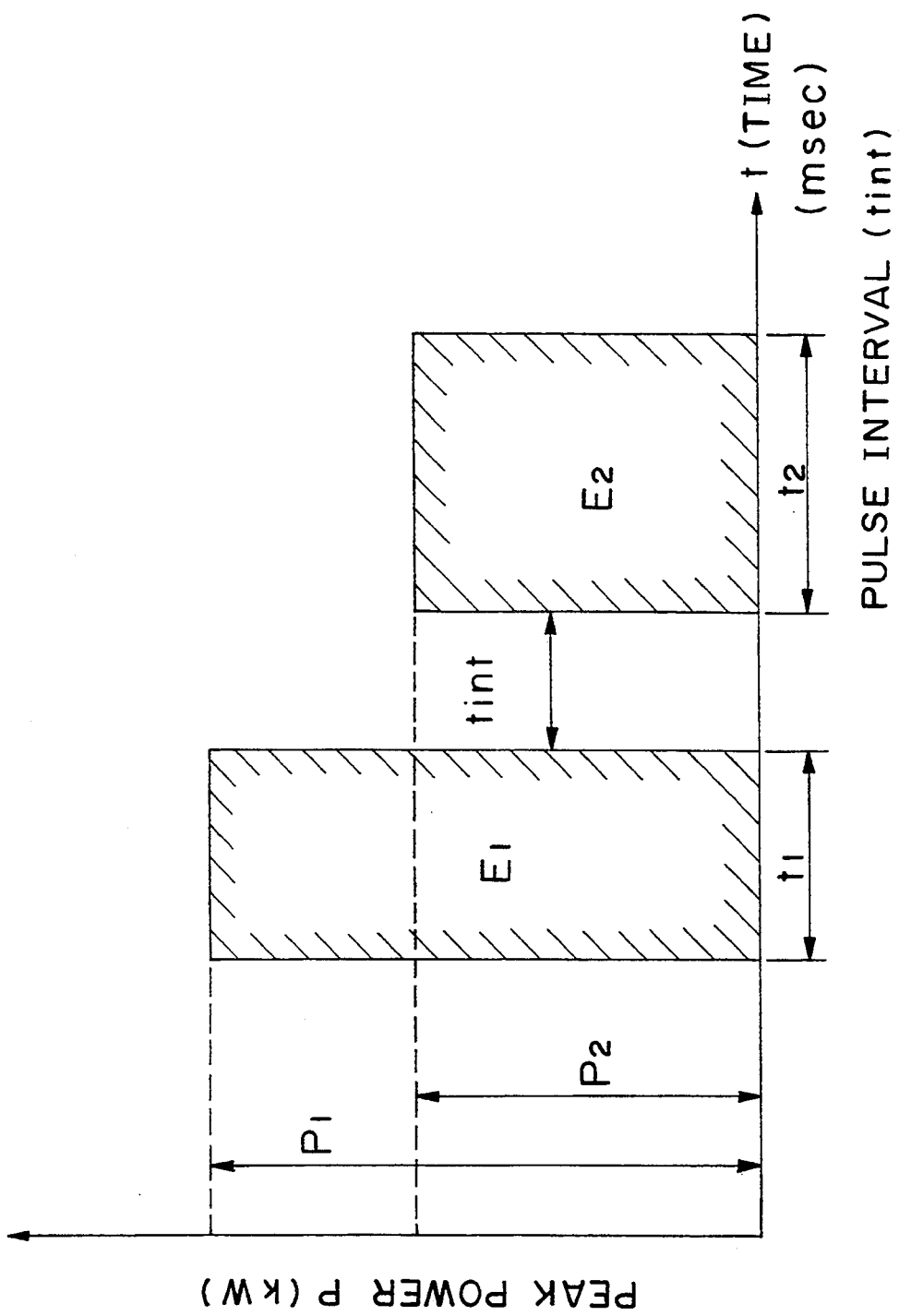
FIG. 3 is a graph showing a two-stage wave form.

As shown in FIG. 3, a two-stage rectangular wave form is used as a laser wave form of a pulse laser generated by a pulse YAG laser 12 under the control of the laser power supply 14 used as the above-described generation control section in FIG. 3, $P_1$ is a first stage peak power and $t_1$ is the pulse width thereof. $P_2$ is a second stage peak power and $t_2$ is the pulse width thereof. f is the pulse repeat frequency.

Accordingly, the first stage energy $E_1$ is given as follows:

$$E_1 = P_1 \cdot t_1$$

The second stage energy $E_2$ is given as follows:

$$E_2 = P_2 \cdot t_2$$

The average peak power $P_{AV}$ per one pulse is defined as follows:

$$P_{AV} = E_{tot}/(t_1+t_2) = (E_1+E_2)/(t_1+t_2)$$

where $E_{tot}$ is the energy of one pulse.

In Example 1 of the present invention, the pulse energy was kept constant and the average peak power $P_{AV}$ was also kept constant in order to obtain the weld bead which was molten to penetrate a first steel plate 2-1 and was partially introduced into a second steel plate 2-2. Under this condition, even if the other parameters would be changed, the depth of weld would not be so changed. In Example 1, $P_{av}$ was set at 5 kW.

Furthermore, the following quantities are defined. Namely, $$\alpha = P_1/P_2$$

$$\beta = t_1/(t_2+t_2)$$

Regarding $\alpha$ and $\beta$ as variables to form a matrix, the experiments were conducted in the range where the variable $\alpha$ was not greater than 3. The evaluation was made in accordance with the measured values of the tension shearing loads in a tension test as well as the visual inspection of the bead appearance.

Figure 4:
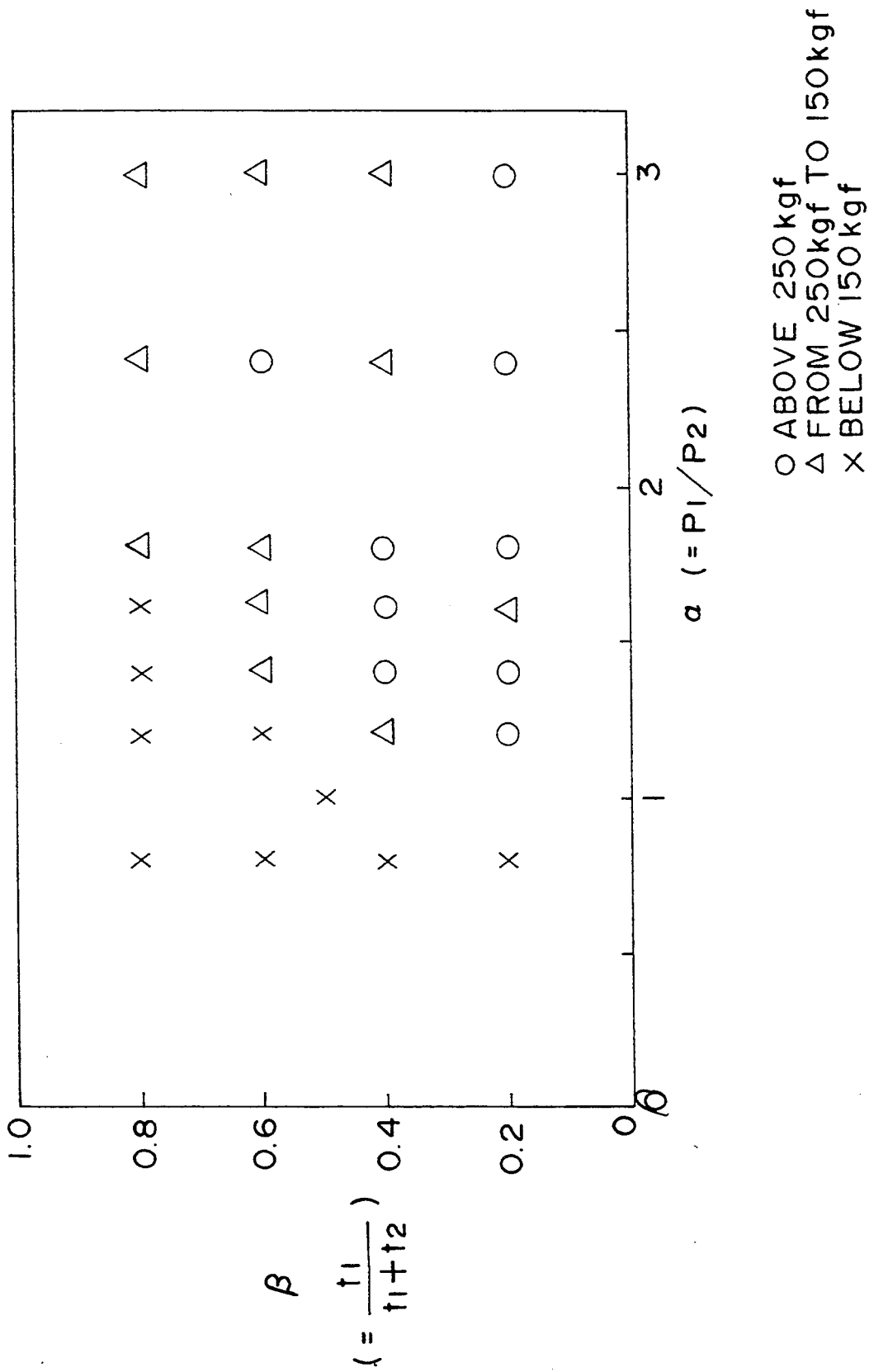
FIG. 4 is a graph showing a view showing a shearing force in matrix tests.
Figure 5:
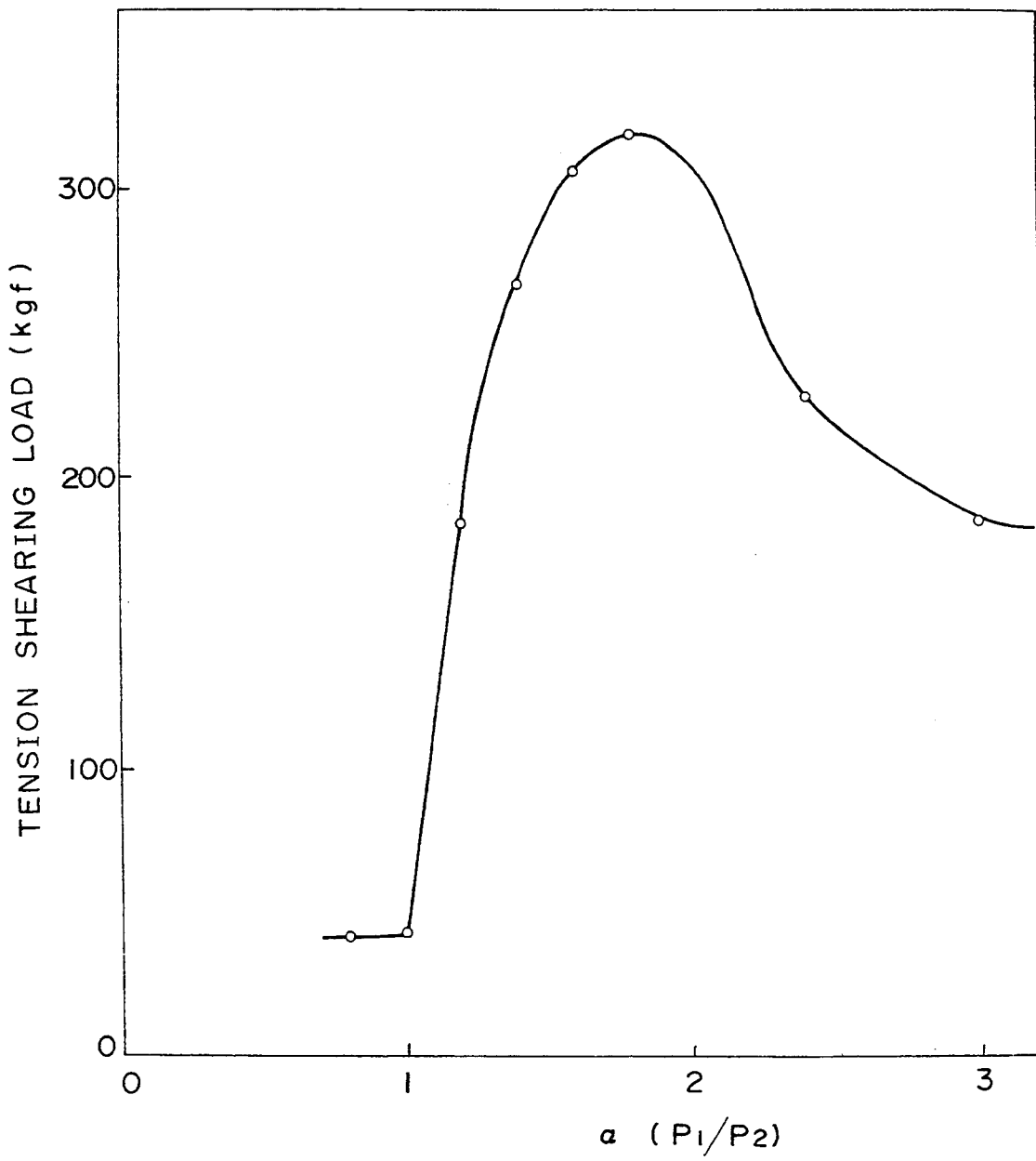
FIG. 5 is a graph showing a relationship between α at β of 0.4 and the shearing force.

As a result, the evaluation results were obtained from the tension strengths at respective points as shown in FIG. 4. Sign ○ represents a tension strength which is not smaller than 250 kgf, Δ represents a tension strength which is not smaller than 150 kgf but not larger than 250 kgf, and x represents a tension strength which is less than 150 kgf, FIG. 5 is a graph showing a change in tension shearing load when the variable $\alpha$ was changed while keeping $\beta$ constant 0.4.

Figure 6:
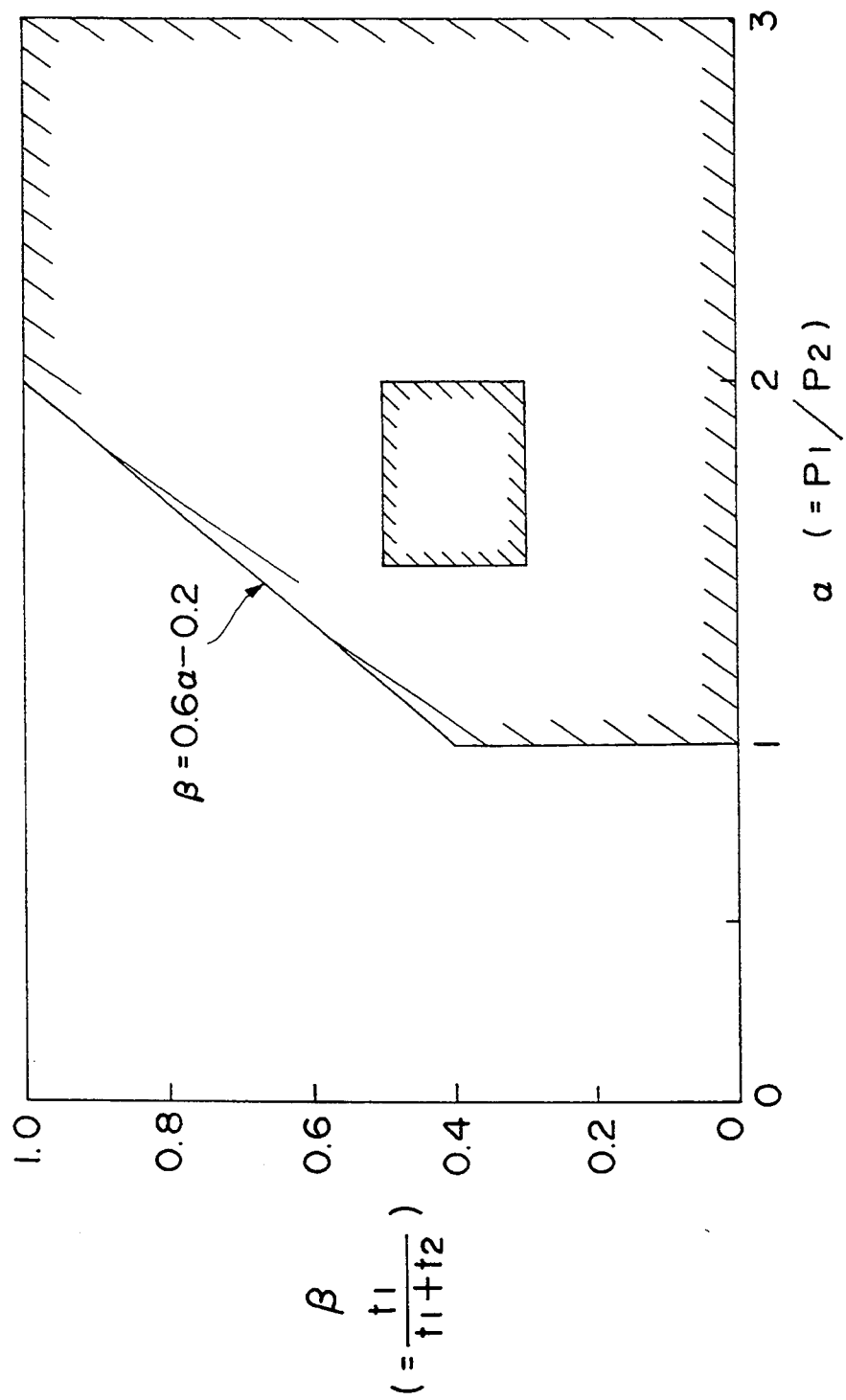
FIG. 6 is a view showing ranges of totally good irradiating levels for α and β.

To summarize the foregoing results, under the following conditions as shown in FIG. 6 in FIG. 6.

$$1 < \alpha < 3.$$

$$0 < \beta < 1.$$

$$\beta \leq 0.6 \, \alpha \cdot 0.2 \tag{1}$$

it was found that, in the weld bead of the present invention, it was possible to greatly improve the property in weld strength and outer aesthetic appearance in comparison with the conventional weld bead which was obtained by a simple one-stage rectangular pulse.

Figure 9:
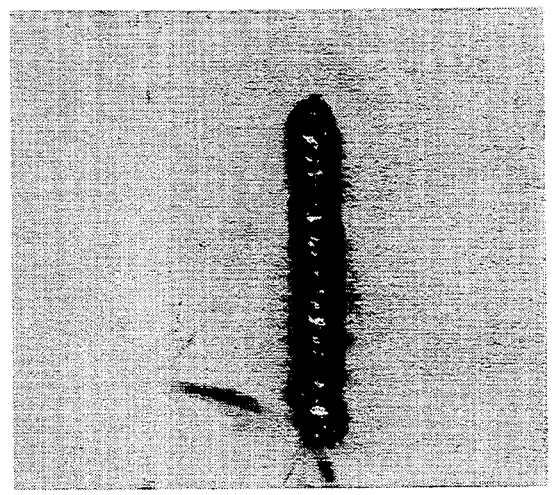
FIG. 9 is a picture showing a weld bead in accordance with Example 1.

Particularly, in the following ranges:

$$1.5 \leq \alpha \leq 2,$$

$$0.3 \leq \beta \leq 0.5 \tag{2}$$

an excellent aesthetic appearance without any weld defects as well as the largest shearing force was insured as shown in FIG. 9 (picture 1).

As explained above, according to Example 1, the plating metallic vapor was effectively removed from the weld bead, and it was possible to obtain the weld bead which had an excellent aesthetic appearance without weld defects and a large shearing force.

In Example 1, a gap between the steel plates was kept at zero mm under the experiments. However, it is possible to obtain the weld bead with almost no weld defects and with a larger shearing force exceeding 400 kgf in the case where a gap is kept at 75 micrometers under the condition that the weld is carried out in the ranges specified in the above relationship (2).

EXAMPLE 2

Figure 7:
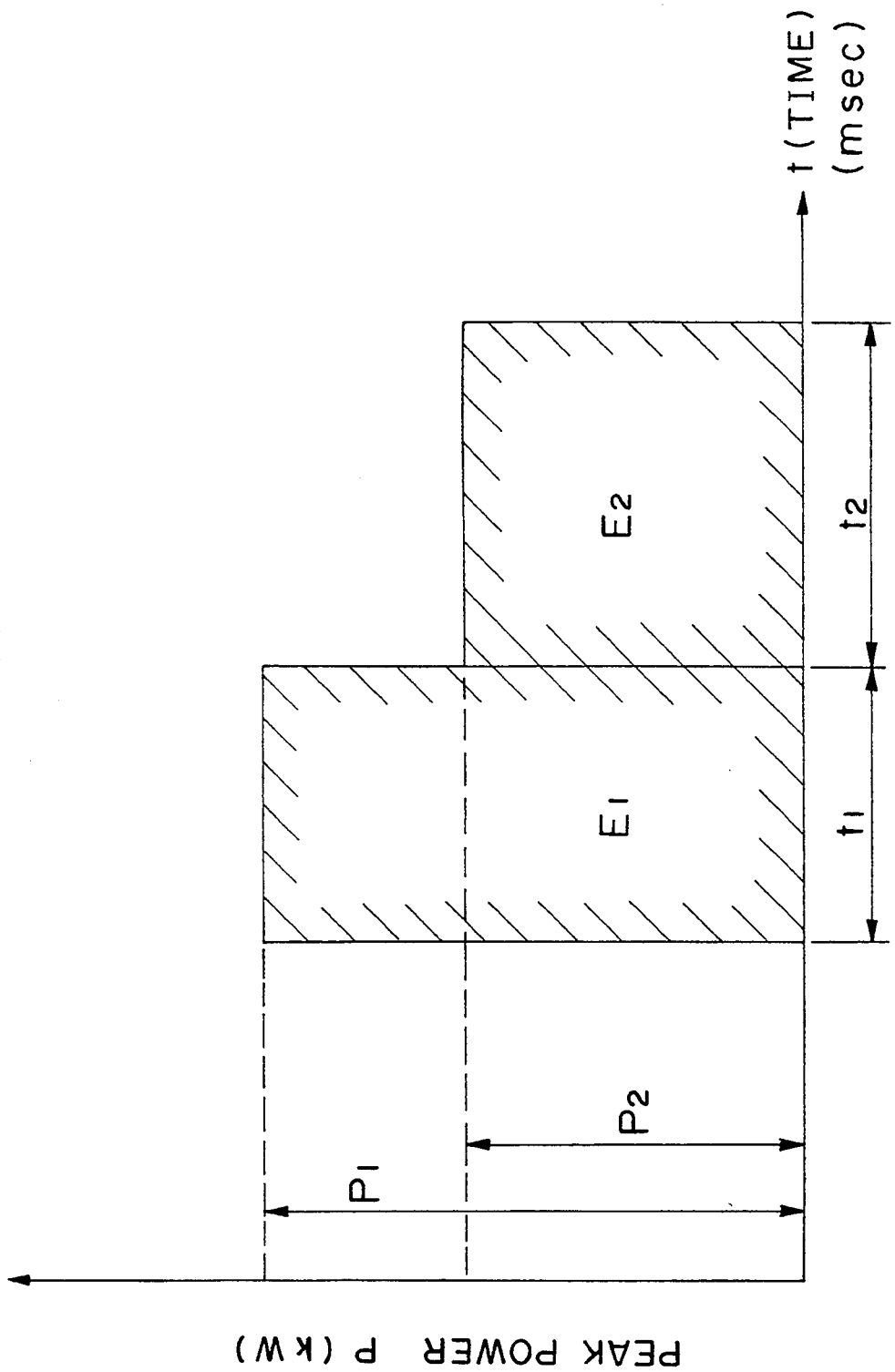
FIG. 7 is a view showing a two-stage rectangular waveform.
Figure 8:
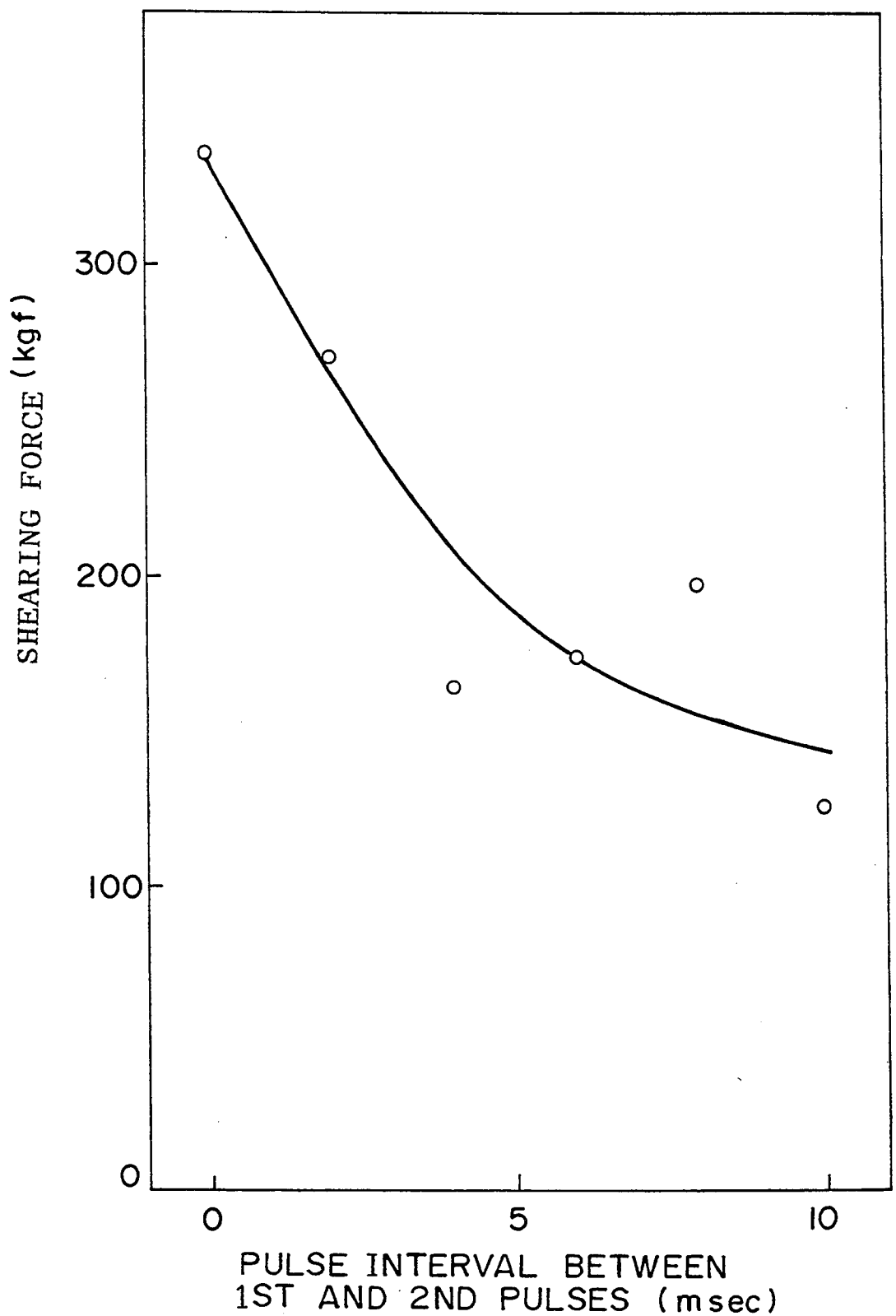
FIG. 8 is a graph showing a relationship between the pulse interval between first and second wave forms and the shearing force.

The laser source section (not shown) is adapted to control the flash lamps 13 so that a pulse interval $t_{int}$ between a first stage pulse wave form and a second stage pulse wave form in a typical two-stage wave form is changed in the range of 0 to 10 msec. FIG. 7 shows a state where the pulse interval is set at zero, i.e., a two-stage continuous rectangular wave form.

If the pulse interval $t_{int}$ is changed from zero to 10 msec, it will be understood that the larger the pulse interval $t_{int}$ between the first and second stage pulse wave forms of the two-stage rectangular wave form, the smaller the shearing force will become as shown in FIG. 7. The outer appearance of the weld bead is close to that of a single wave form (see Comparative Example 1).

COMPARATIVE EXAMPLE 1

Figure 10:
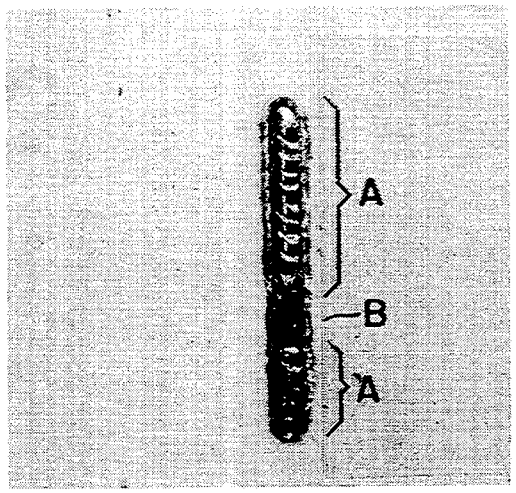
FIG. 10 is a picture showing a weld bead in accordance with Comparative Example 1.

The Comparative Example 1 shows a weld with a one-stage rectangular wave form pulse having the same output and peak energy as those of Example 1. In Comparative Example 1, as shown in FIG. 10 (picture 2), raised portions and holes were formed in the weld bead surface, resulting in appearance faults. In the holes, a splash of surface molten metal was produced due to the evaporation zinc vapor, resulting in lack of the weld metal. FIG. 10 shows the raised portion A and the hole B. Below holes were formed in the interior of the weld metal in the raised portions A.

As a result, a large amount of the sputter caused by the splash of the molten metal was formed, and the sputter was stuck onto the sample surface, resulting in appearance faults. A large blow hole where the zinc vapor was entrained into between the first steel plate 2-1 and the second steel plate 2-2 was formed in the interior of the molten metal. Where the blow hole was formed, there was almost no melt-bond between the steel plates.

COMPARATIVE EXAMPLE 2

Figure 11:
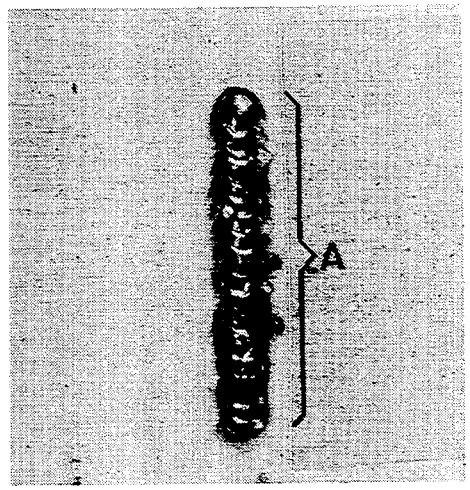
FIG. 11 is a picture showing a weld bead in accordance with Comparative Example 2.

In Comparative Example 2, a gap of 75 micrometers was provided between the first steel plate 2-1 and the second steel plate 2-2. The weld was carried out with a one-stage reactangular wave form. As a result, in the same manner as in Comparative Example 1, as shown in FIG. 11 (picture 3), there were various defects such as weld appearance fault and formation of raised portions, blow holes and sputters. The Comparative Example 2 just exhibited a very low level of the tension shearing force, resulting in weld defect. In FIG. 11(picture 3), the raised portions A were shown, and the blowholes were formed at the raised portions A in the interior of the molten metal. Also, the sputter would escape to the outside to damage the optical system of the laser emission section

COMPARATIVE EXAMPLE 3

In Comparative Example 3, the pulse wave form was of the two-stage rectangular type but the variables $\alpha$ and $\beta$ did not meet the ranges defined by the foregoing inequalities (1). For instance, FIG. 12 (picture 4) shows the outer appearance of the weld bead at a point where $\alpha$ is 1.2 and $\beta$ is 0.8. At this point, the outer appearance of the weld bead was degraded and the weld was poor, resulting from the splash of the sputter and the blow holes entrained in the weld material. This would lead to the shearing force reduction.

Figure 12:
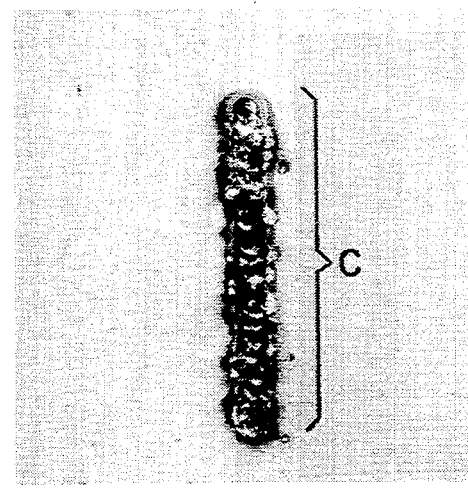
FIG. 12 is a picture showing a weld bead in accordance with Comparative Example 3.
Figure 13A:
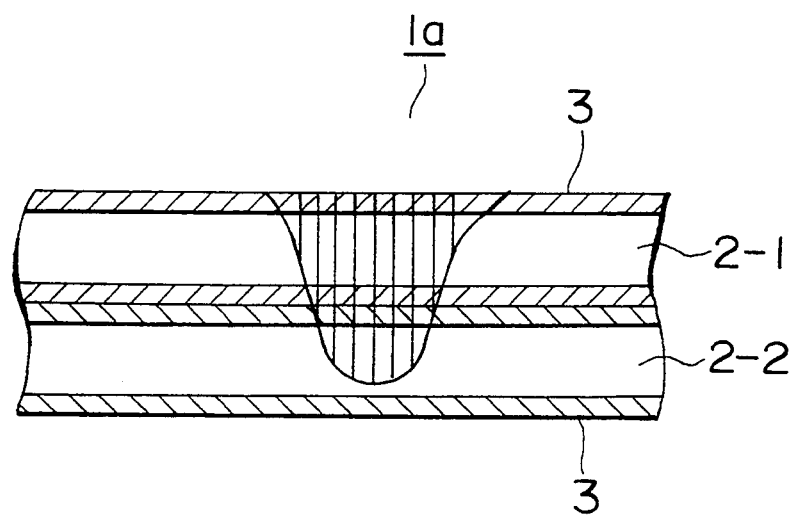
FIGS. 13(a) and (b) are views showing examples of a melt-weld for two plates.
Figure 13B:
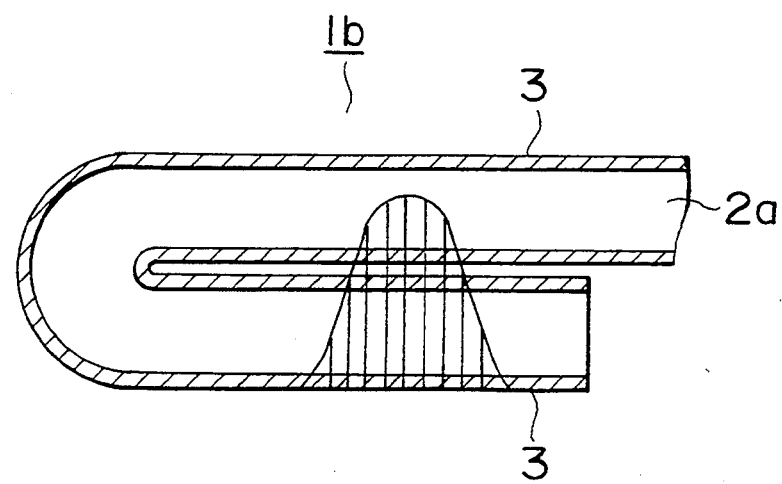
Figure 14A:
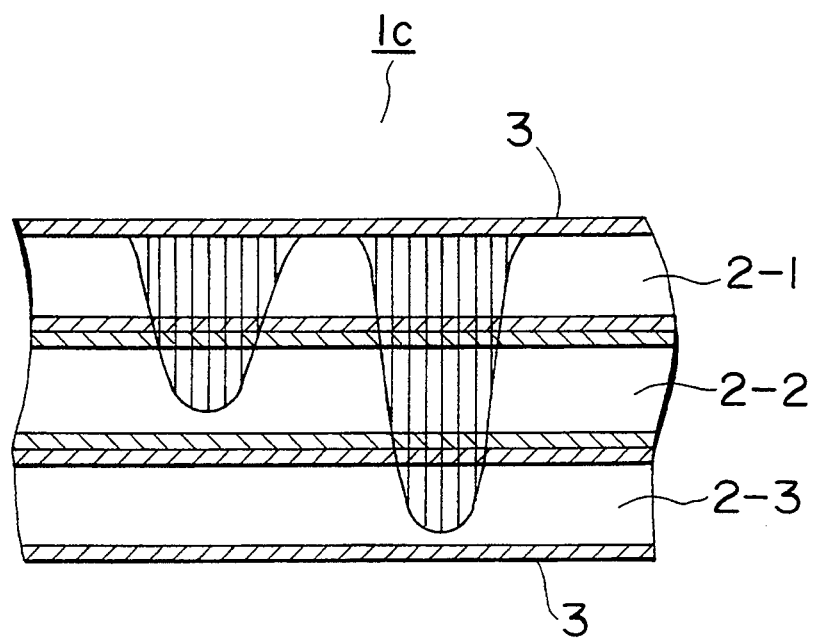
FIGS. 14(a) and (b) are views showing examples of a melt-weld for three plates.
Figure 14B:
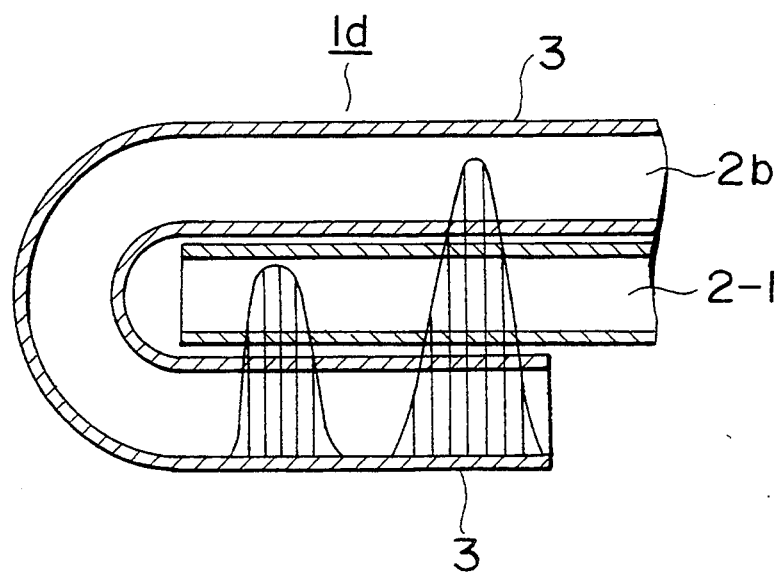
Figure 15A:
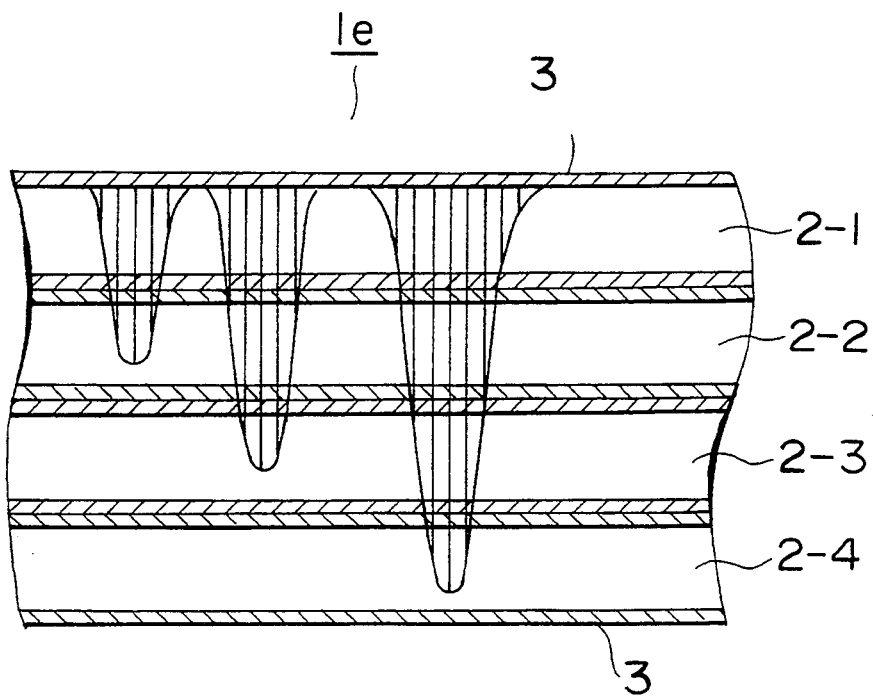
FIGS. 15(a) and (b) are views showing examples of a melt-weld for four plates.
Figure 15B:
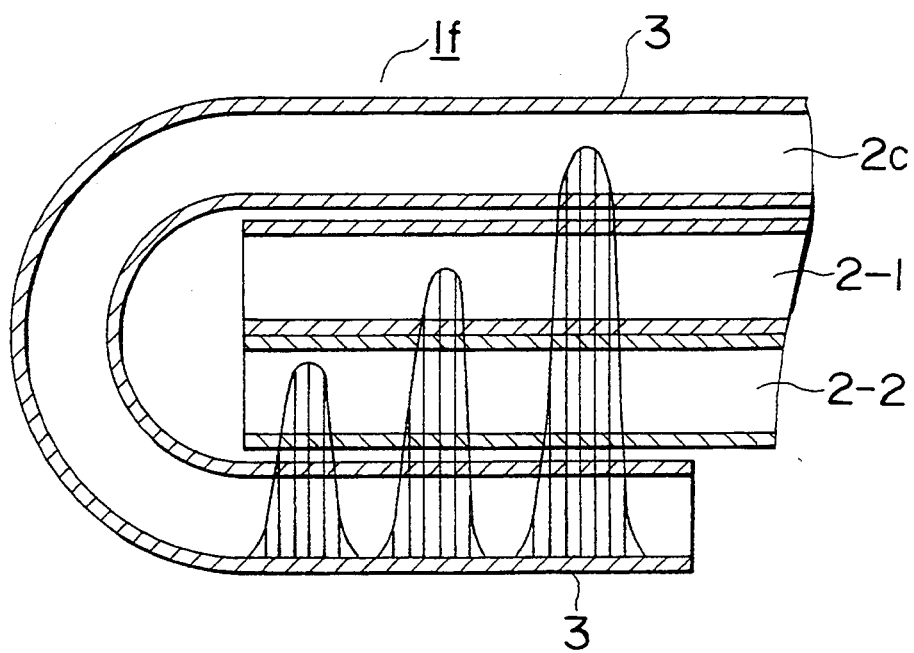
Figure 16:
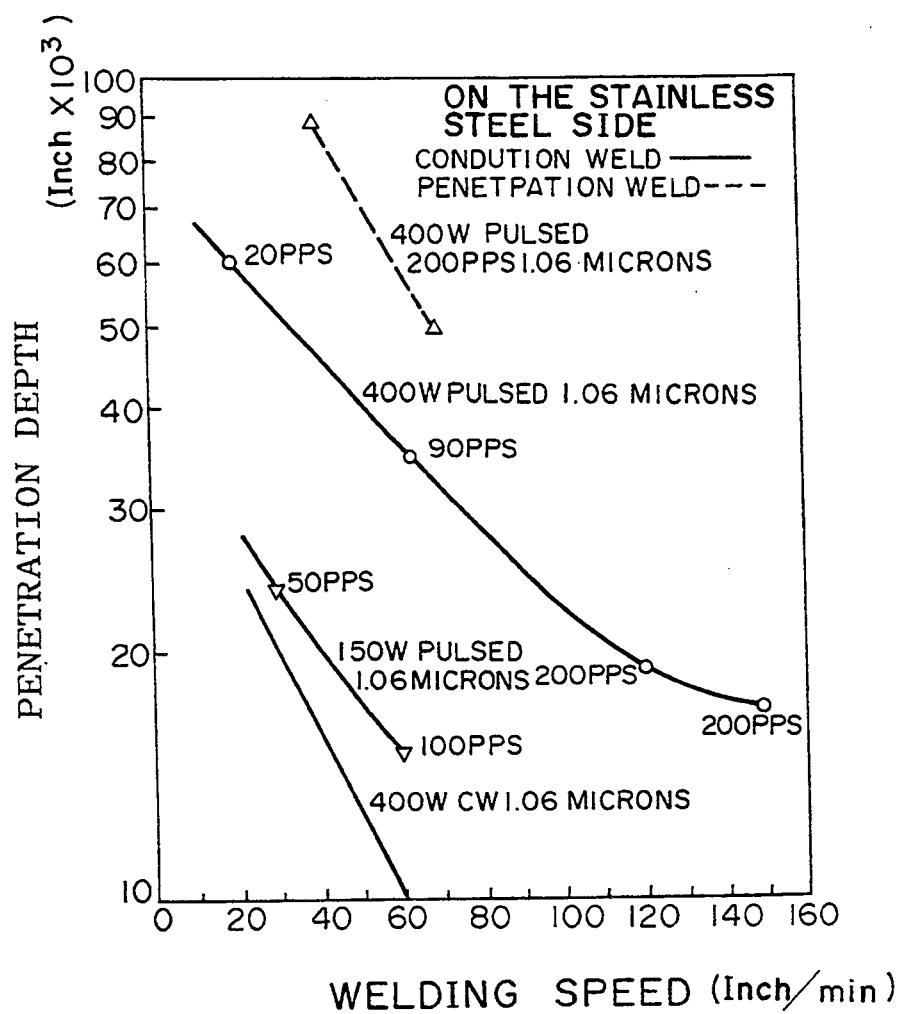
FIG. 16 is a graph showing a one-pulse energy needed for obtaining a desired penetration depth.
Figure 17:
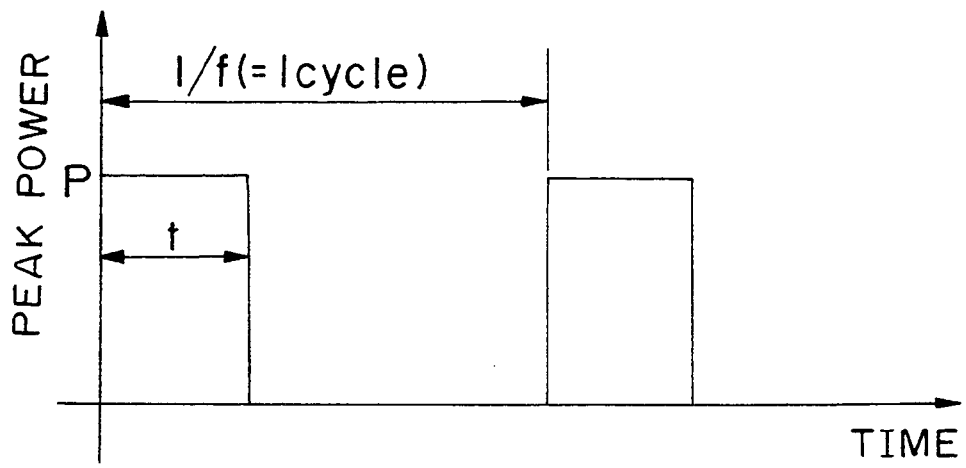
FIG. 17 is a graph showing rectangular wave forms.
Figure 18:
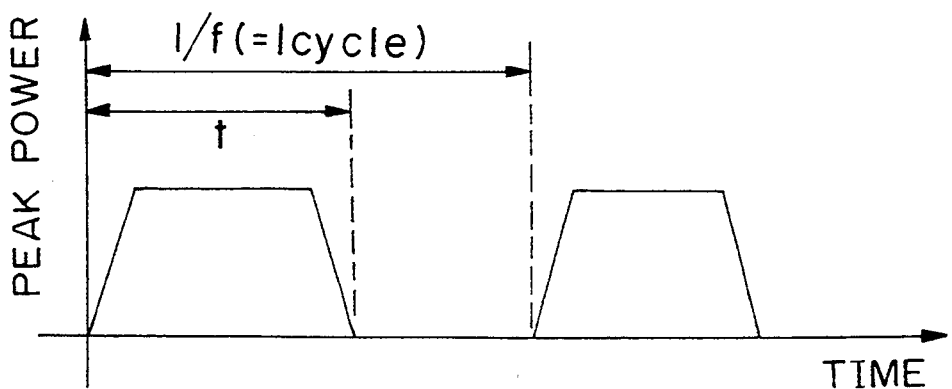
FIG. 18 is a graph showing integrated wave forms.
Figure 19:
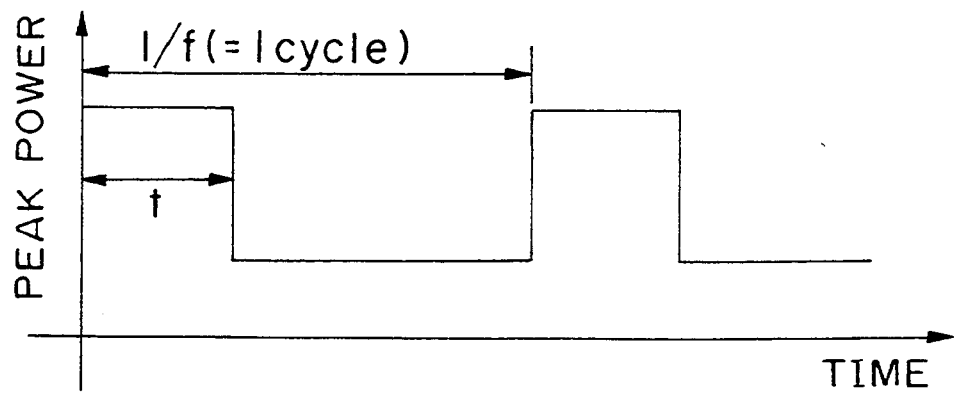
FIG. 19 is a graph showing hybrid wave forms overlapped with a CW laser.

In FIG. 12, the weld bead degradation C including the blow holes was formed and the sputter escaped to the outside.

Also, an angle $\theta$ defined between the centerline of the pulse laser and a line normal to the plated steel plate surface was set in the range of 0° to 60°, so that a durability of the protective glass located just in front of the lens 22 was approximately four times larger than that where the angle was outside the range. (Namely, the number of the weld beads measured until the transmittance laser output was reduced by 10% was reduced from about 200 to 400.)

When the angle $\theta$ would be excessively increased, the interference with the weld workpiece and work clamp jigs would become remarkable. In this case, it is possible to ensure the durability of the protective glass by suitably selecting the angle $\theta$ within 10° to 40°.

Examples 1 and 2 and Comparative Examples 1-3 have been explained above. According to Examples 1 and 2, the irradiation wave form of the pulse laser is of the two-stage type and the irradiation parameters are set in a predetermined range so that the plating metallic vapor may be effectively removed away from the weld beads and the weld beads having good weld appearance and large shearing force with almost no weld defects may be obtained. Also, there is almost no damage to be imparted to the optical system. Thus, it is possible to reduce the load to be imposed for maintenance of the system.

What is claimed is:

1. A pulse laser irradiation apparatus for irradiating a pulse laser beam onto coated metal materials, comprising:

a pulse laser generator having a laser medium and a power supply for exciting said pulse laser from outside; and a generation control section for controlling the pulse laser generator;

wherein said generation control section generates two reactangular waves in a pulse wave form at every cycle of the pulse laser beam generated by said pulse laser generator and controls a relationship between a peak power $P_1$(kW) and a pulse width $t_1$(msec) of a first rectangular wave and a peak power $P_2$(kW) and a pulse width $t_2$(msec) of a second rectangular wave in predetermined ranges.

2. The apparatus according to claim 1, wherein said predetermined ranges in said generation control section are as follows:

$$0 < t_1/(t_1+t_2) < 1.$$

$$P_1/P = > 1.$$

and $$t_1/(t_1+t_2) \leqq 0.6(P_1/P_2) - 0.2$$

(Definitions:
   $P_1$(kW): the peak power of the first rectanglar,
   $P_2$(kW): the peak power of the second rectanglar,
   $t_1$(msec): the pulse width of the first rectanglar,
   $t_2$(msec): the pulse width of the second rectangular.)

3. The apparatus according to claim 1, wherein said predetermined ranges in said generation control section are as follows:

$$0.3 \leqq t_1/(t_1+t_2) \leqq 0.5$$

$$1.5 \leq P_1/P_2 \leq 2.0$$

(Definitions:
 $P_1(kW)$: the peak power of the first rectanglar,
 $P_2(kW)$: the peak power of the second rectanglar,
 $t_1(msec)$: the pulse width of the first rectangular,
 $t_2(msec)$: the pulse width of the second rectanglar.)

4. The apparatus according to claim 1, wherein said generation control section controls said pulse laser generator so that a time interval between said two rectangular waves is not longer than 10 msec.

5. The apparatus according to claim 1, wherein said generation control section controls said pulse laser generator so that a time interval between said two rectangular waves is not longer than 2 msec.

6. The apparatus according to claim 1, wherein said generation control section controls said pulse laser generator so that, when a plurality (N) of coated metal plates overlapped one on another are welded together, a pulse energy of said pulse laser beam is set at a strength such that a part of an N-th coated metal plate is welded through an (N−1)-th coated metal plate.

7. The apparatus according to claim 1 wherein said coated metal materials comprise a plated steel plate and an angle defined between a centerline of said pulse laser beam and a line normal to a surface of said plated steel plate is in the range of 0° to 60°.

8. The apparatus according to claim 1 wherein said coated metal materials comprise a plated steel plate and an angle defined between a centerline of said pulse laser beam and a line normal to a surface of said plated steel plate is in the range of 10° to 40°.

9. A pulse laser irradiation method for irradiating a pulse laser beam onto coated metal materials including step of:
 generating two rectangular waves in a pulse wave form at every cycle of the pulse laser beam; and
 controlling a relationship between a peak power $P_1(kW)$ and a pulse width $t_1(msec)$ of a first rectangular wave and a peak power $P_2(kW)$ and a pulse width $t_2(msec)$ of a second rectangular wave in ranges as follows:

$$0 < t_1/(t_1+t_2) < 1,$$

$$P_1/P_2 > 1.$$

and $$t_1/(t_1+t_2) \leq 0.6(P_1/P_2) - 0.2.$$

10. The method according to claim 9, wherein said ranges are as follows:

$$0.3 \leq t_1/(t_1+t_2) \leq 0.5$$

$$1.5 \leq P_1/P_2 \leq 2.0$$

(Definitions:
 $P_1(kW)$: the peak power of the first rectanglar,
 $P_2(kW)$: the peak power of the second rectanglar,
 $t_1(msec)$: the pulse width of the first rectanglar,
 $t_2(msec)$: the pulse width of the second rectanglar)

11. The method according to claim 9, the interval ($t_{int}$) between said two rectangular waves is as follows:

$$t_{int} \leq 10 \text{ msec.}$$

* * * * *